(12) United States Patent
Lu

(10) Patent No.: US 11,635,187 B2
(45) Date of Patent: Apr. 25, 2023

(54) TRANSPARENT LAMPSHADE USED FOR SOLAR LAMP AND SOLAR LAMP

(71) Applicant: ZHONGSHAN YUSEN LIGHTING TECHNOLOGY CO., LTD., Zhongshan (CN)

(72) Inventor: Jianquan Lu, Baise (CN)

(73) Assignee: ZHONGSHAN YUSEN LIGHTING TECHNOLOGY CO., LTD., Zhongshan (CN)

( * ) Notice: Subject to any disclaimer, the term of this patent is extended or adjusted under 35 U.S.C. 154(b) by 0 days.

(21) Appl. No.: 17/584,278

(22) Filed: Jan. 25, 2022

(65) Prior Publication Data
US 2022/0146073 A1 May 12, 2022

(30) Foreign Application Priority Data
Dec. 16, 2021 (CN) .......................... 202123194573.7

(51) Int. Cl.
| | |
|---|---|
| *F21S 8/02* | (2006.01) |
| *F21V 1/12* | (2006.01) |
| *F21S 9/03* | (2006.01) |
| *F21V 23/00* | (2015.01) |
| *F21V 5/00* | (2018.01) |

(52) U.S. Cl.
CPC ................ *F21V 1/12* (2013.01); *F21S 8/022* (2013.01); *F21S 9/037* (2013.01); *F21V 5/008* (2013.01); *F21V 23/004* (2013.01)

(58) Field of Classification Search
CPC .. F21S 8/022; F21S 9/037; F21V 1/12; F21V 1/146; F21V 21/0824; F21V 23/004; F21V 3/049; F21W 2131/109
See application file for complete search history.

(56) References Cited

U.S. PATENT DOCUMENTS

| | | | | |
|---|---|---|---|---|
| 4,999,060 | A * | 3/1991 | Szekely | ................ H01L 31/048 362/183 |
| 5,224,773 | A * | 7/1993 | Arimura | .................. F21V 5/046 362/800 |
| 5,237,490 | A * | 8/1993 | Ferng | ........................ F21V 5/04 362/240 |
| 6,808,291 | B1 * | 10/2004 | Aylward | .................. B60Q 7/00 362/186 |
| 10,424,173 | B1 * | 9/2019 | Bien | ....................... F21S 9/037 |

(Continued)

*Primary Examiner* — Zheng Song
(74) *Attorney, Agent, or Firm* — Nitin Kaushik

(57) ABSTRACT

The present disclosure discloses a transparent lampshade used for solar lamp, comprising a transparent lampshade body, an upper side of the lampshade body is provided with an installing recess for installing a solar luminous lamp assembly, and an upper light-transmitting portion located on a circumference of the installing recess and capable of exposing the solar luminous lamp assembly and transmitting light upwardly. Through cooperation of the installing recess and the upper light-transmitting portion in the disclosure, not only the installation of the solar luminous lamp assembly but also the use effect of light transmission on the upper side can be realized, and the outstanding effect close to the full-lighting even can be achieved, thus to maximally improve lighting effect of the whole solar lamp and bring people a more impressive visual impact, thereby greatly meeting more practical needs and facilitating further innovation and development of industry.

8 Claims, 18 Drawing Sheets

(56) References Cited

U.S. PATENT DOCUMENTS

| | | | | |
|---|---|---|---|---|
| 2003/0201874 A1* | 10/2003 | Wu | .................... | F21V 21/0824 |
| | | | | 340/573.2 |
| 2006/0044785 A1* | 3/2006 | Lee | ........................ | F21S 8/00 |
| | | | | 362/276 |
| 2008/0175006 A1* | 7/2008 | Kellmann | ............... | F21V 3/023 |
| | | | | 362/363 |
| 2009/0168411 A1* | 7/2009 | Yen | .................... | F21V 21/0824 |
| | | | | 362/183 |
| 2009/0268438 A1* | 10/2009 | Huang | ............ | G08B 13/19632 |
| | | | | 362/183 |
| 2012/0069581 A1* | 3/2012 | Chen | ........................ | F21V 3/04 |
| | | | | 156/299 |
| 2013/0049609 A1* | 2/2013 | Browder | ................. | F21S 9/037 |
| | | | | 315/159 |
| 2022/0146075 A1* | 5/2022 | Lu | ........................ | F21V 5/046 |
| 2022/0196218 A1* | 6/2022 | Liu | ....................... | F21V 23/003 |
| 2022/0325861 A1* | 10/2022 | Donahue | ................ | H02S 40/22 |

* cited by examiner

TRANSPARENT LAMPSHADE USED FOR SOLAR LAMP AND SOLAR LAMP

TECHNICAL FIELD

The present disclosure relates to the technical field of lamps, and in particular to a transparent lampshade used for solar lamp, and a solar lamp.

RELATED ART

Solar lamps can convert sunlight energy into electrical energy and store in rechargeable batteries during the day, and they can automatically brighten and illuminate when night comes. The solar powered garden lamps are widely used in park lawns, garden villas, square green spaces, tourist attractions, holiday villages, golf courses, green lawns of enterprises and factories, green lawns of residential quarters and other landscape lighting places because of their outstanding characteristics of energy saving, environmental protection, safety and beauty.

However, since most of the existing solar lamps are provided with a cover on an upper side of a transparent lampshade, or an entire luminous lamp assembly is arranged and covered on the upper side of the transparent lampshade, so that the existing solar lamps can only emit light circumferentially around the transparent lampshade, but cannot emit light on the upper side of the transparent lampshade. Therefore, those skilled in the art urgently need to develop a transparent lampshade that can be used for both installing the solar luminous lamp assembly and achieving the brightness on the upper side as well, and a solar lamp with the transparent lampshade having the above-mentioned characteristics, so as to meet new using requirements.

SUMMARY

In view of the above-mentioned existing technical problems, the solution to be solved by the present disclosure is to provide a transparent lampshade used for solar lamp.

In order to solve the above technical problems, the present disclosure is achieved by the following technical solution.

A transparent lampshade used for solar lamp, comprising a transparent lampshade body, wherein an upper side of the lampshade body is provided with a downward installing recess for installing a solar luminous lamp assembly, and an upper light-transmitting portion located on a circumference of the installing recess and capable of exposing the solar luminous lamp assembly and capable of transmitting light upwardly.

The transparent lampshade used for solar lamp as mentioned above, wherein the upper light-transmitting portion comprises a first outer convex annular portion protruding outwardly, and an upper convex annular portion arranged on an upper side of the first outer convex annular portion and protruding upwardly.

The transparent lampshade used for solar lamp as mentioned above, wherein light refracting patterns are provided on an outer surface of the first outer convex annular portion.

The transparent lampshade used for solar lamp as mentioned above, wherein the transparent lampshade body is further provided with a lower light-transmitting portion located on a lower side of the upper light-transmitting portion and integrally formed with the upper light-transmitting portion.

The transparent lampshade used for solar lamp as mentioned above, wherein both the lower light-transmitting portion and the upper light-transmitting portion are configured as convoluted, and a radial dimension of the lower light-transmitting portion is smaller than that of the upper light-transmitting portion.

The transparent lampshade used for solar lamp as mentioned above, wherein the transparent lampshade body is further provided with a light diffusing cavity located within the upper light-transmitting portion and the lower light-transmitting portion, the light diffusing cavity is communicated with the installing recess for diffusing the light emitted by the solar luminous lamp assembly.

The transparent lampshade used for solar lamp as mentioned above, wherein the upper light-transmitting portion comprises a second outer convex annular portion protruding outwardly, and an upper convex sloping annular portion arranged on an upper side of the second outer convex annular portion and arranged obliquely inward.

The present disclosure further provides a solar lamp, comprising the transparent lampshade used for solar lamp as mentioned above, and a solar luminous lamp assembly arranged in the installing recess for emitting light.

The solar lamp as mentioned above, wherein the solar luminous lamp assembly comprises:

a solar power-generating panel arranged within the installing recess and used for solar power generation;

a PCB board arranged on a lower side of the solar power-generating panel and connected with the solar power-generating panel; and a luminous lamp bead electrically connected to the PCB board for emitting light.

The solar lamp as mentioned above, wherein the transparent lampshade body is further provided with a connecting through hole located at a bottom thereof;

the solar lamp further comprises a power storing-supplying assembly arranged in the connecting through hole and connected with the PCB board and used for storing electric energy generated by the solar power-generating panel and also supplying power to the luminous lamp bead.

The solar lamp as mentioned above, wherein the solar lamp further comprises a sheet power storing-supplying module arranged on a lower side of the solar power-generating panel and connected with the PCB board and used for storing electric energy generated by the solar power-generating panel and also supplying power to the luminous lamp bead.

Compared to the existing technology, the present disclosure has the following advantages:

1. In the present disclosure, the solar luminous lamp assembly is installed on the transparent lampshade body through the installing recess, and the solar luminous lamp assembly is exposed out while light transmission upwardly is achieved through the upper light-transmitting portion. By this way, not only the installation of the solar luminous lamp assembly but also the use effect of light transmission on the upper side can be realized, and the outstanding effect close to the full-lighting even can be achieved, thus to maximally improve the lighting effect of the whole solar lamp and bring people a more impressive visual impact as well, thereby greatly meeting more practical needs and facilitating to further innovation and development of industries.

2. In the present disclosure, the power storing-supplying assembly is arranged in the connecting through hole, which has the advantages of greatly reducing not only the overall thickness but also the production cost of the solar luminous lamp assembly.

3. In the present disclosure, the sheet power storing-supplying module is arranged between the solar power-generating panel and the PCB board, which has the advantages of greatly decreasing an overall height of the solar luminous lamp assembly and greatly simplifying the production steps, thus to help reduce the workload of workers.

DETAILED DESCRIPTION

Figure 1:
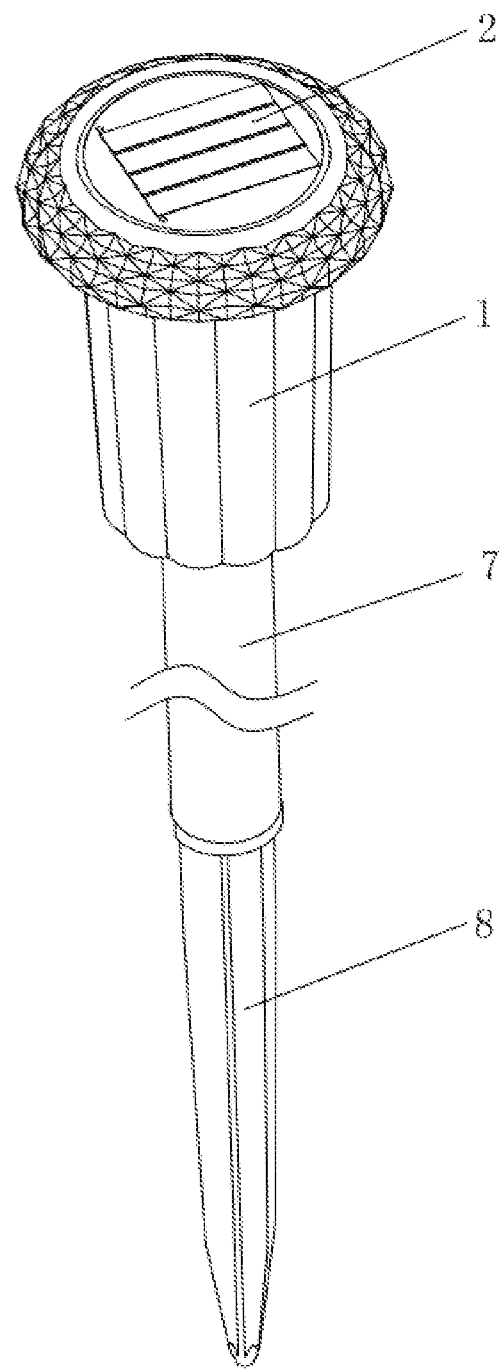
FIG. 1 is a perspective view of a solar lamp according to Embodiment 1 of the present disclosure.
Figure 2:
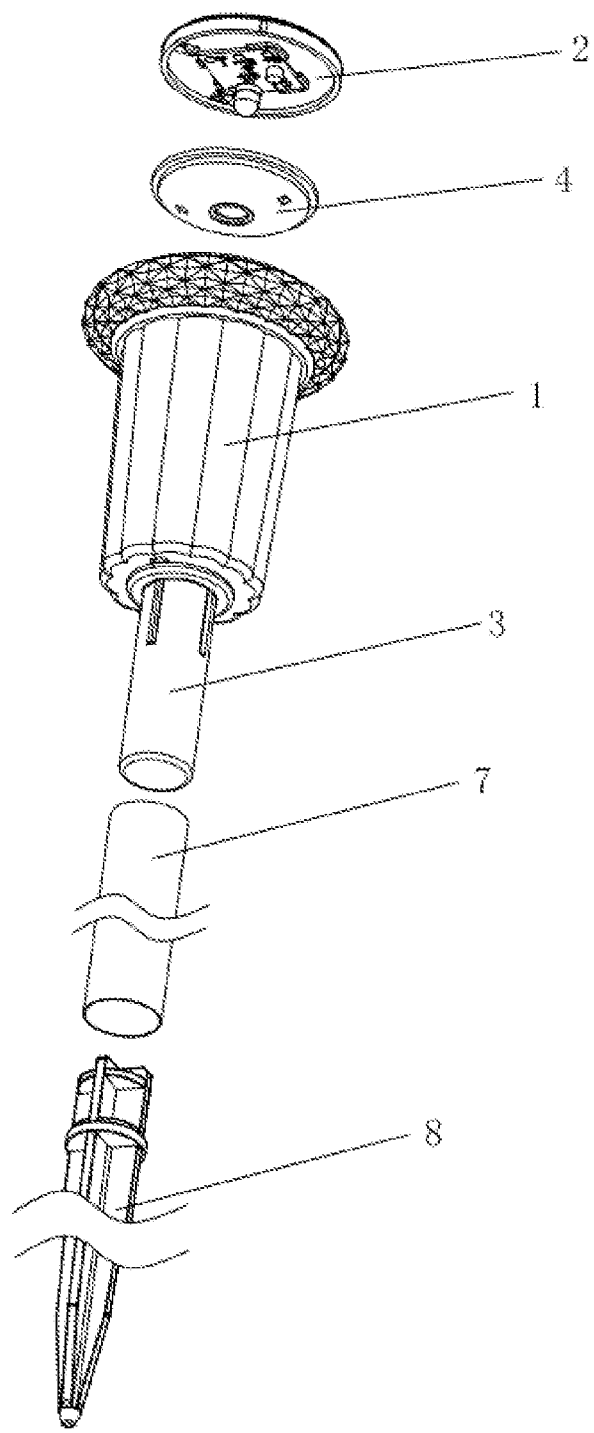
FIG. 2 is a partial exploded view of the solar lamp according to Embodiment 1 of the present disclosure.
Figure 3:
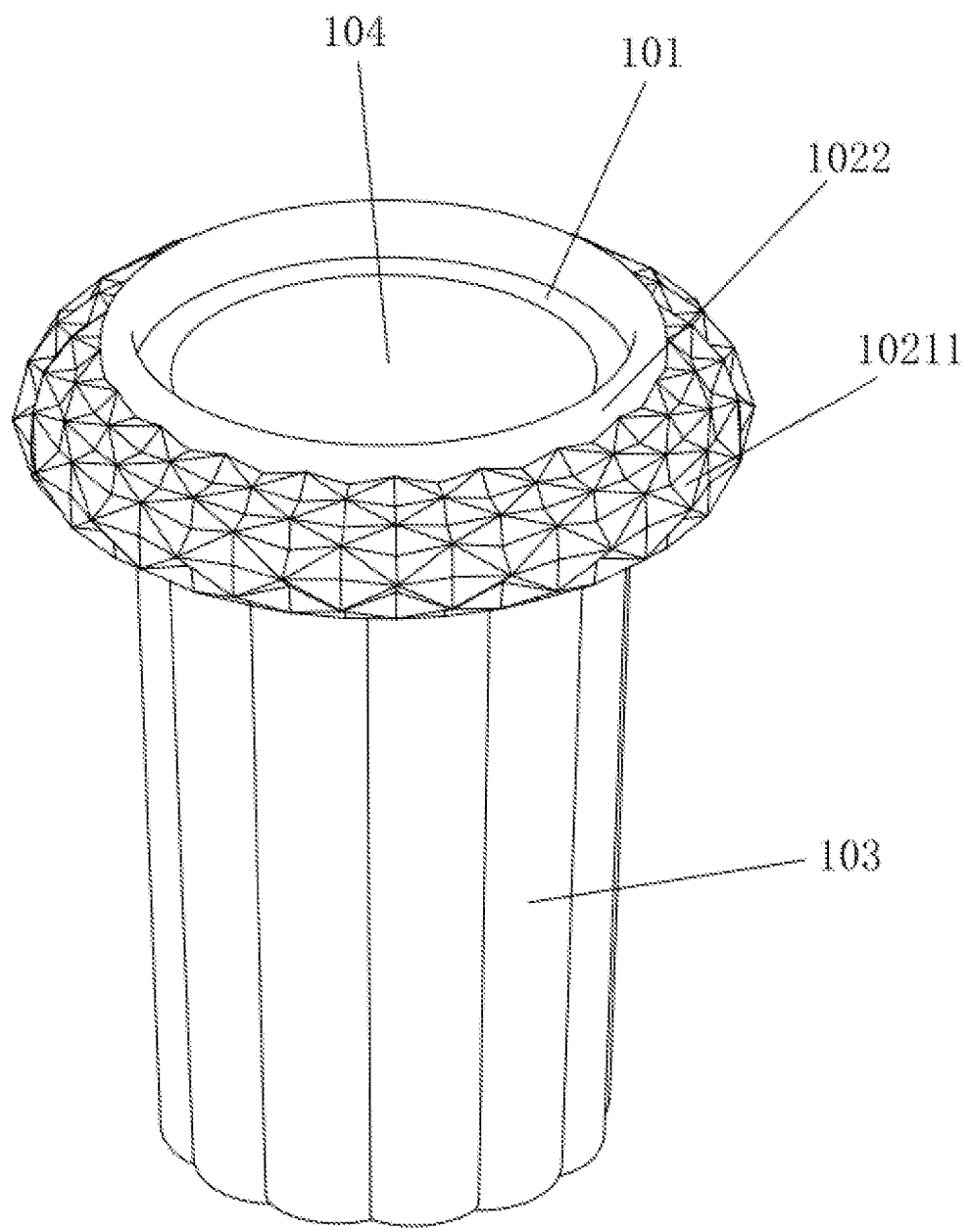
FIG. 3 is a perspective view of a transparent lampshade of the solar lamp according to Embodiment 1 of the present disclosure.
Figure 4:
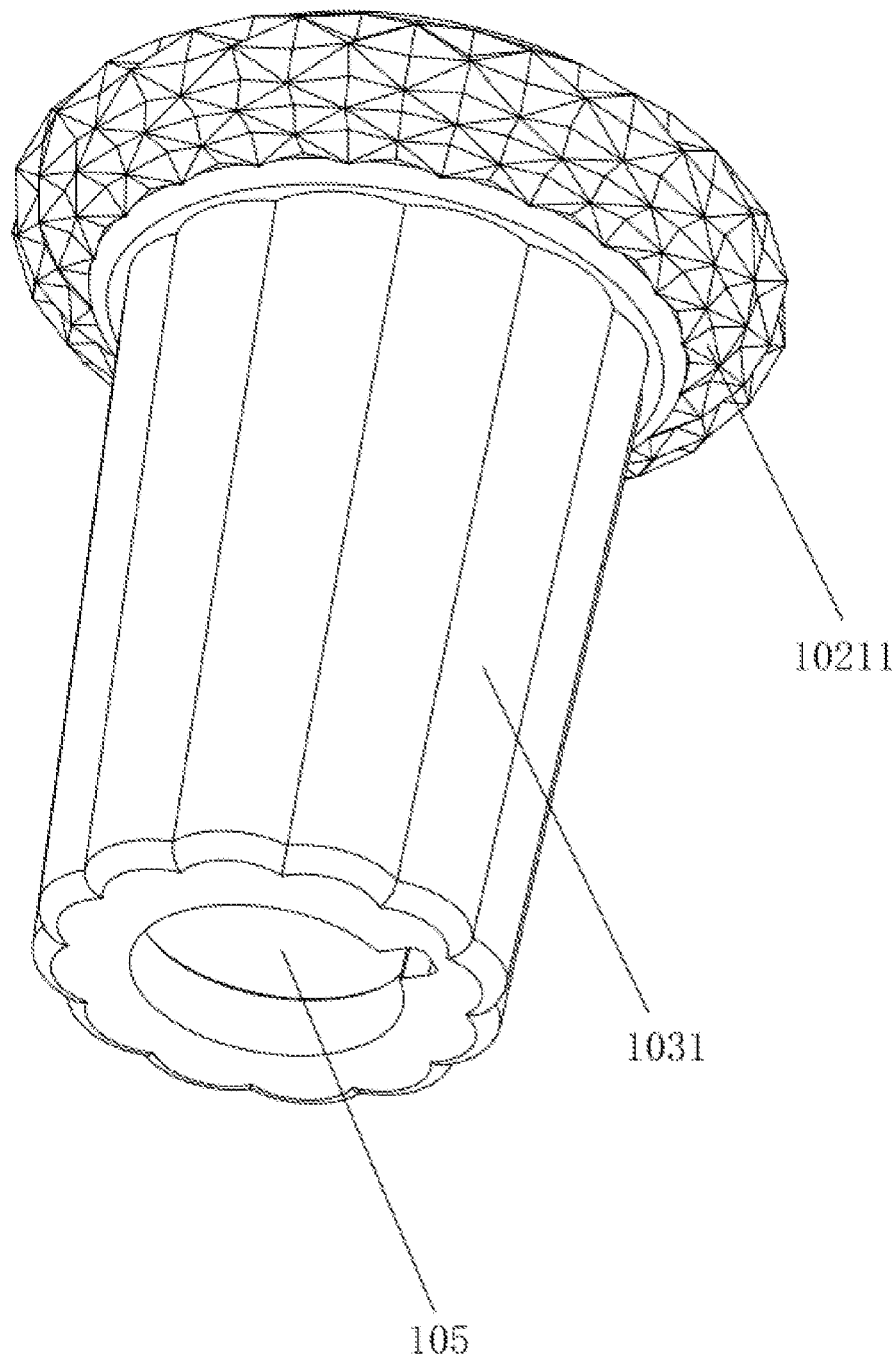
FIG. 4 is another perspective view of the transparent lampshade of the solar lamp according to Embodiment 1 of the present disclosure from another aspect.
Figure 5:
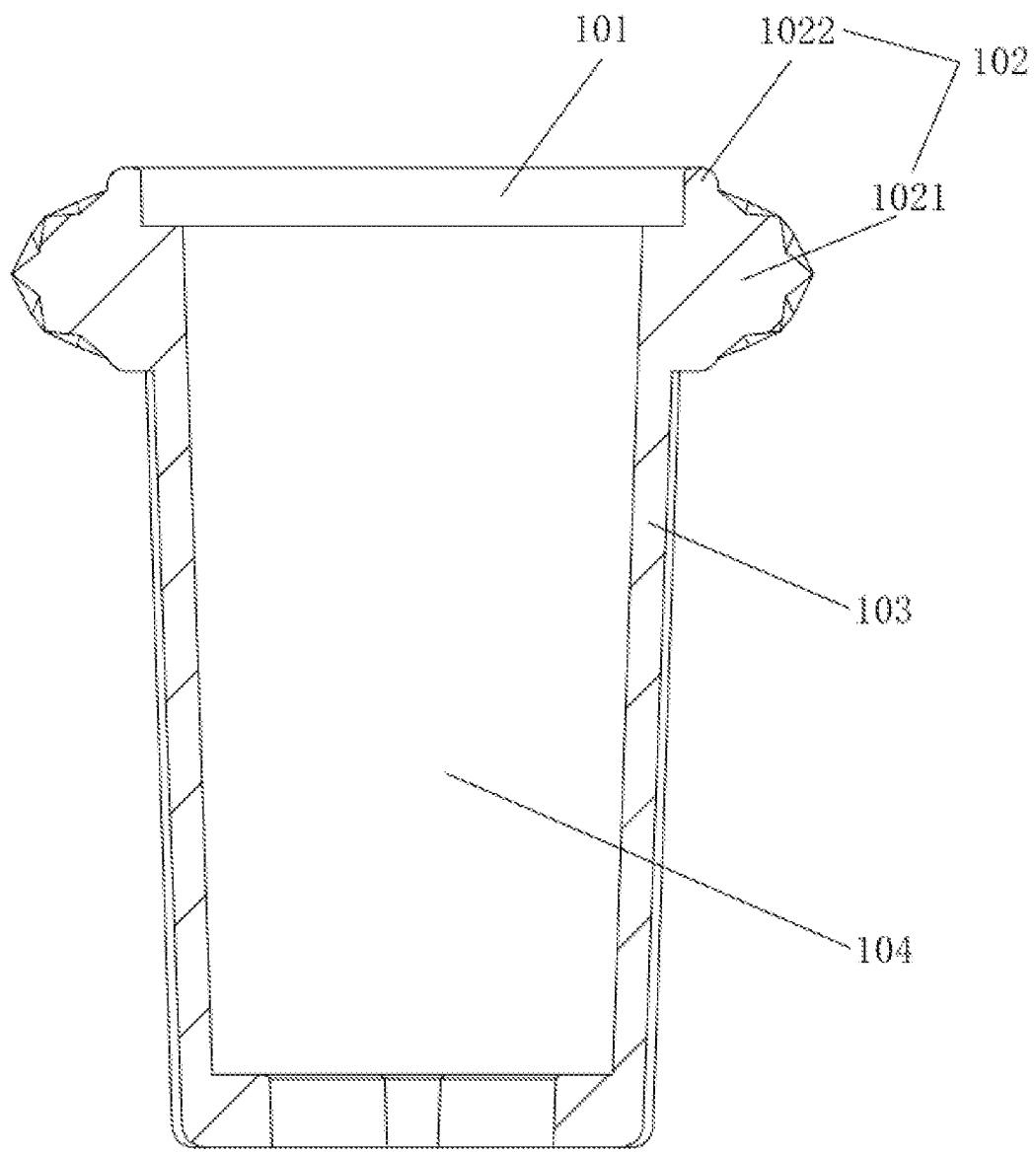
FIG. 5 is a cross-sectional view of the transparent lampshade of the solar lamp according to Embodiment 1 of the present disclosure.
Figure 6:
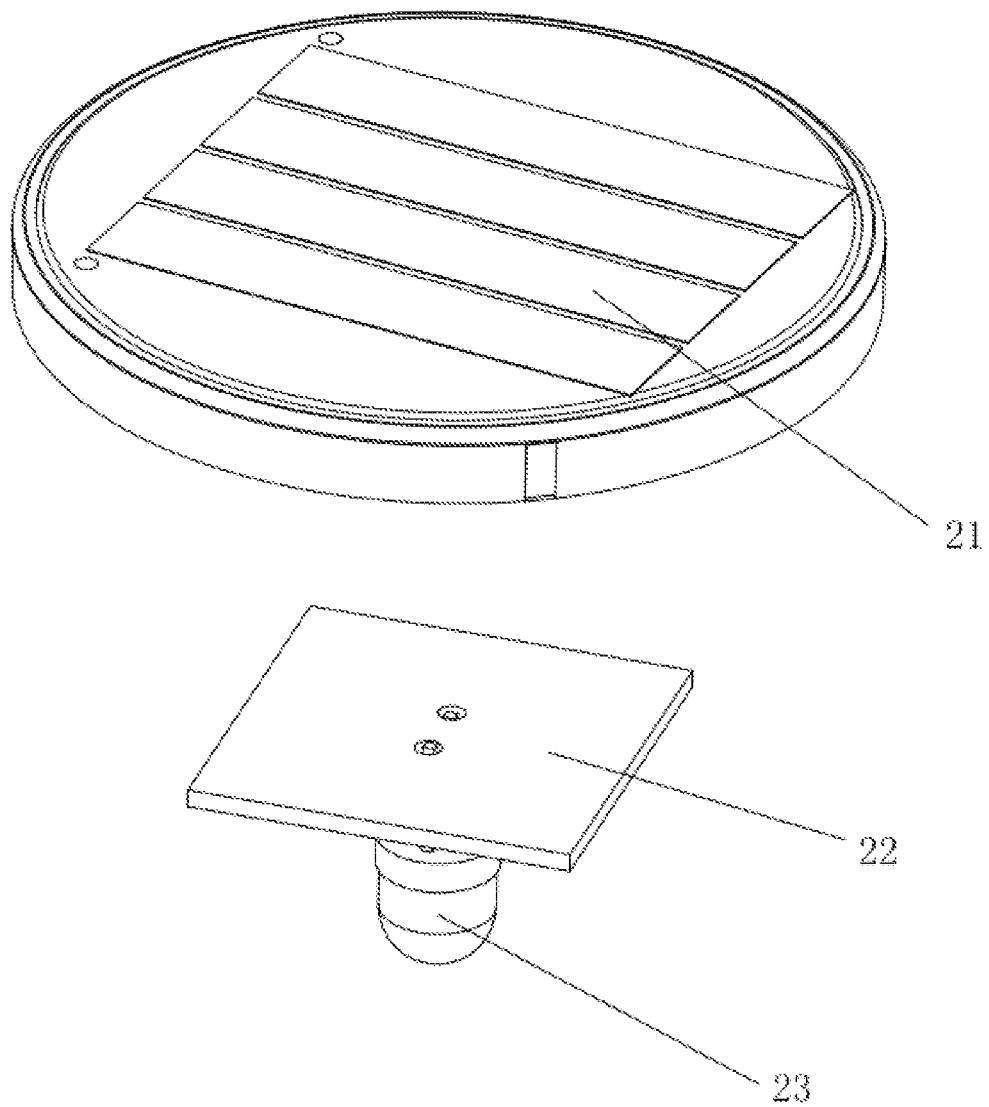
FIG. 6 is a partial exploded view of a solar luminous lamp assembly of the solar lamp according to Embodiment 1 of the present disclosure.
Figure 7:
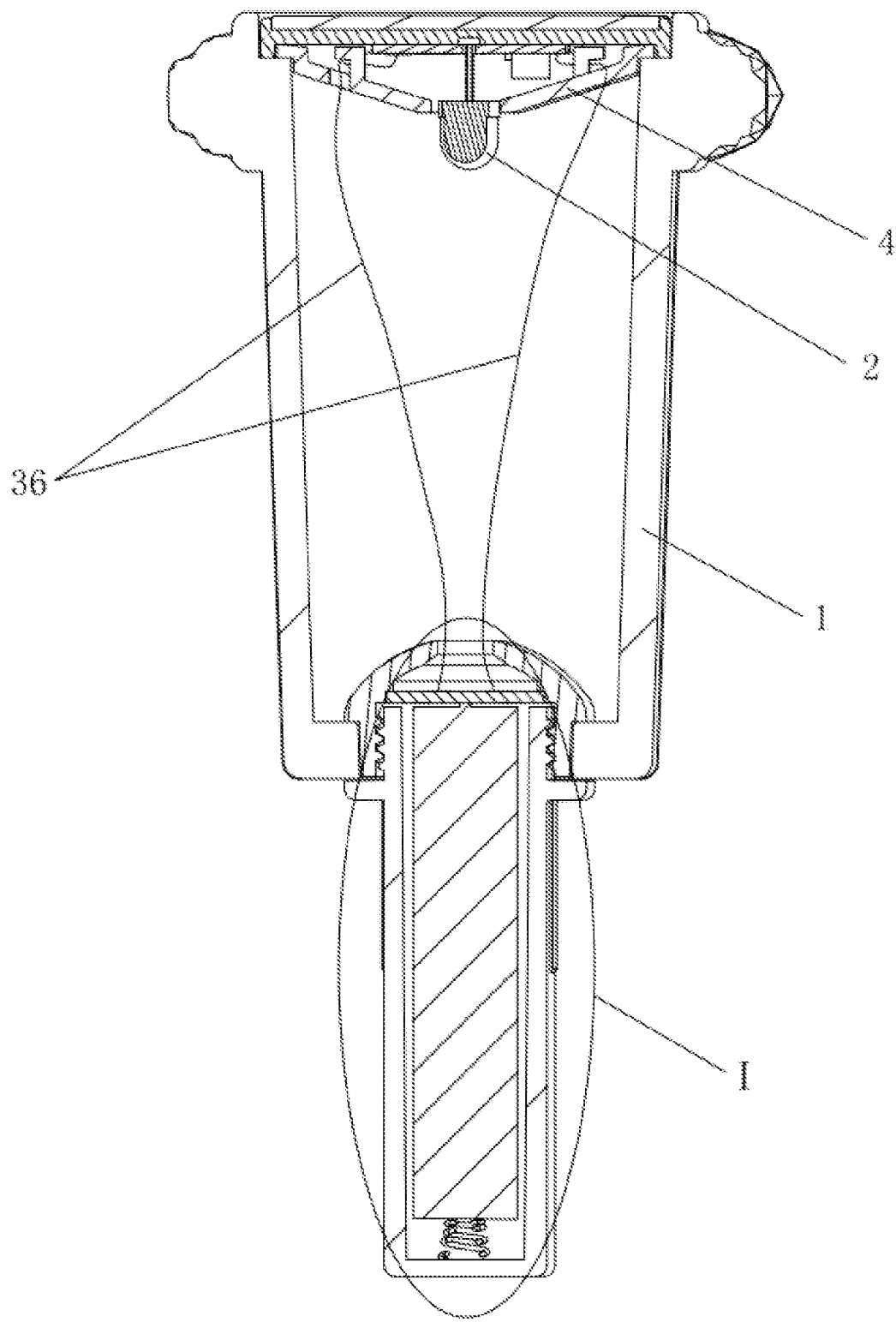
FIG. 7 is a cross-sectional view of the solar lamp according to Embodiment 1 of the present disclosure when a connecting sleeve and a ground-inserting connector are hidden.
Figure 8:
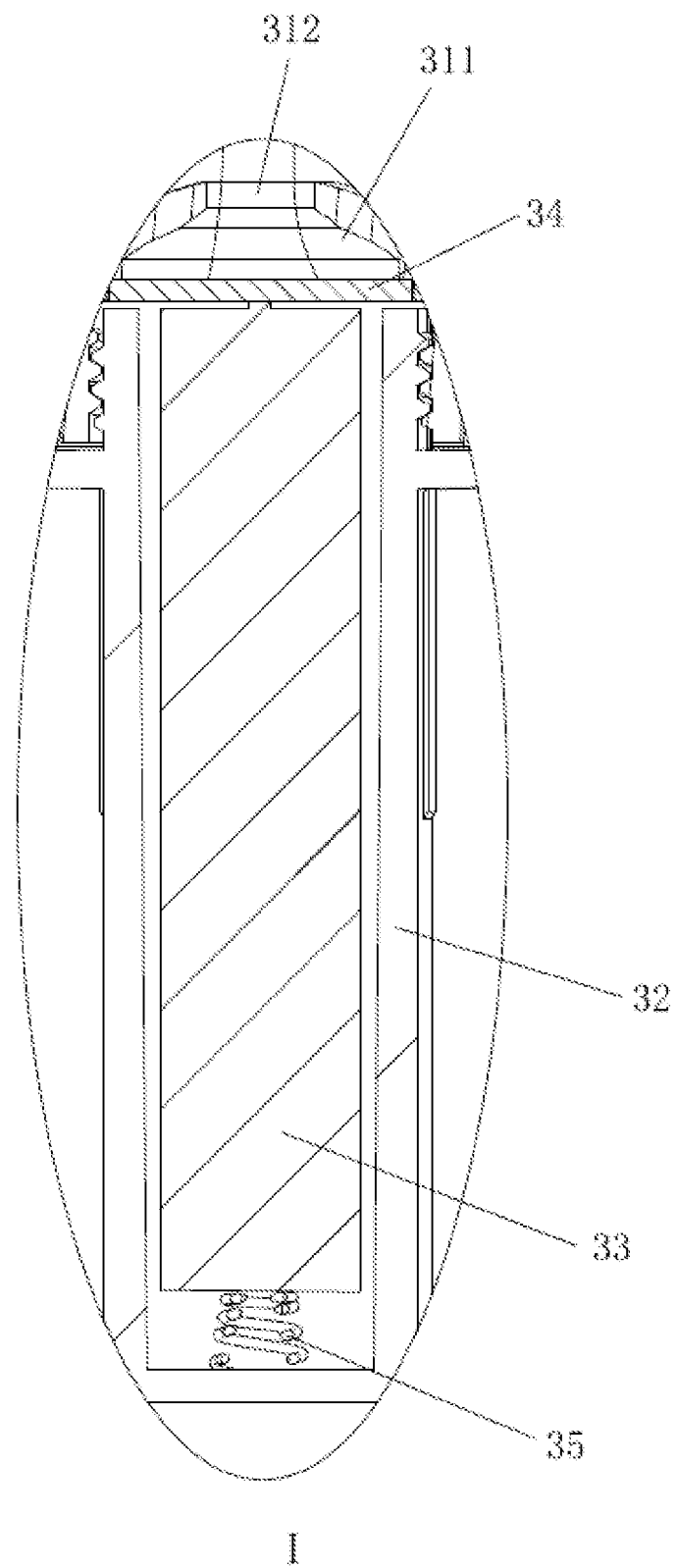
FIG. 8 is a partial enlarged view I of FIG. 7.
Figure 9:
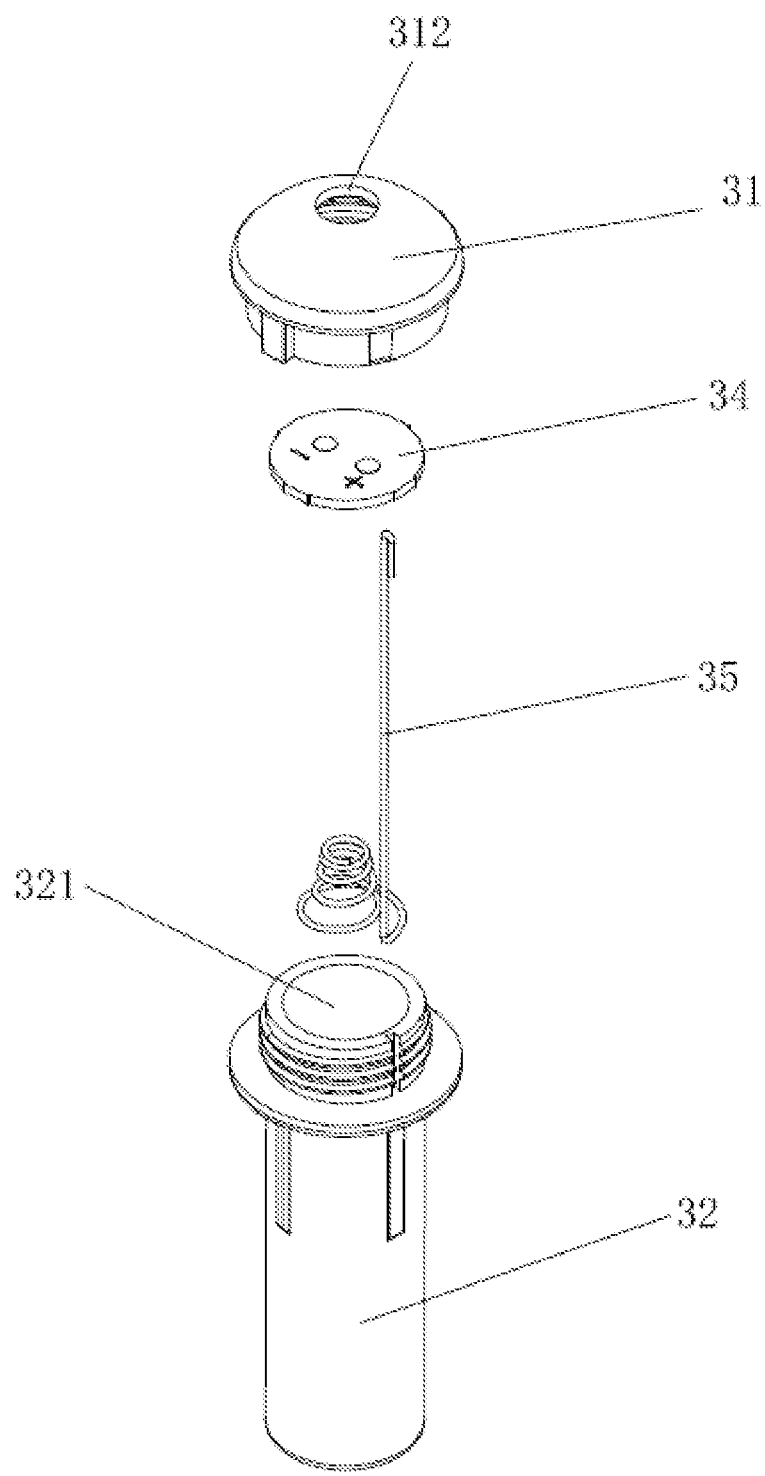
FIG. 9 is an exploded view of the solar lamp according to Embodiment 1 of the present disclosure when a first storage battery is hidden by a power storing-supplying assembly.
Figure 10:
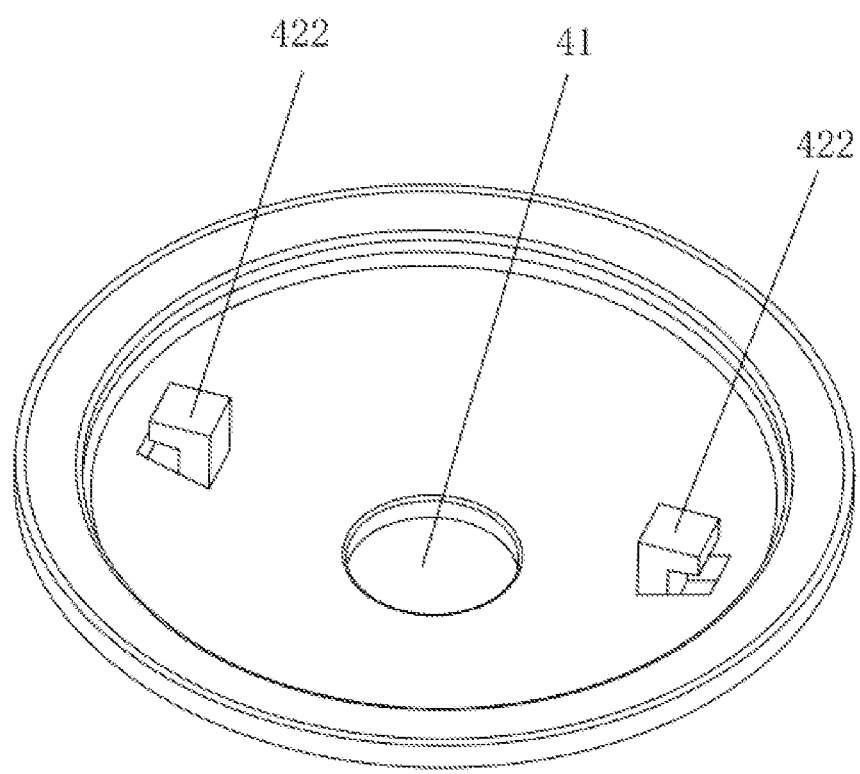
FIG. 10 is a perspective view of a reflective cup of the solar lamp according to Embodiment 1 of the present disclosure.
Figure 11:
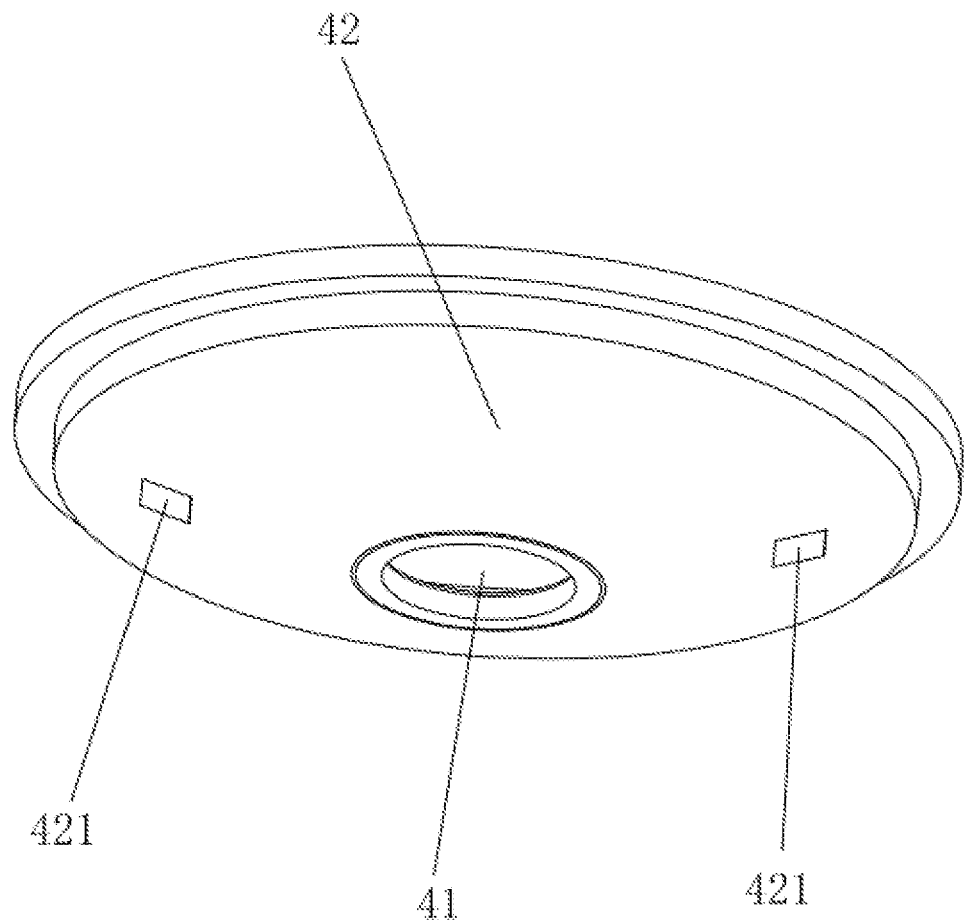
FIG. 11 is another perspective view of the reflective cup of the solar lamp according to Embodiment 1 of the present disclosure from another aspect.

The present disclosure will be further described in detail hereafter in the specific embodiments in combination with the drawings.

Embodiment 1

As shown in FIG. 1 to FIG. 11, a solar lamp comprises a transparent lampshade, wherein the transparent lampshade comprises a transparent lampshade body 1. An upper side of the lampshade body 1 is provided with a downward installing recess 101 for installing a solar luminous lamp assembly 2, and an upper light-transmitting portion 102 located on a circumference of the installing recess 101 and capable of exposing the solar luminous lamp assembly 2 and capable of transmitting light upwardly.

In the present disclosure, the solar luminous lamp assembly 2 is installed on the lampshade body 1 through the installing recess 101, the solar luminous lamp assembly 2 is exposed out while upwards transmission of light is achieved through the upper light-transmitting portion 102. By this way, not only the installation of the solar luminous lamp assembly 2 but also the use effect of light transmission on the upper side can be realized, and the outstanding effect close to the full-lighting even can be achieved, thus to maximally improve the lighting effect of the whole solar lamp, and to bring people a more impressive visual impact as well, thereby greatly meeting more practical needs and facilitating further innovation and development of industry.

Further, the upper light-transmitting portion 102 comprises a first outer convex annular portion 1021 protruding outwardly, and an upper convex annular portion 1022 arranged on an upper side of the first outer convex annular portion 1021 and protruding upwardly, and the purpose thereof is to divide the upper light-transmitting portion 102 into two parts, thereby facilitating to provide refracting patterns on a surface of the first outer convex annular portion 1021.

Furthermore, light refracting patterns 10211 are provided on the outer surface of the first outer convex annular portion 1021. The light refracting pattern 10211 is preferably a diamond cut pattern, which has the advantages of greatly improving sparkling and resplendent effects of the entire lamp when the lamp is turned on, thereby further improving the viewing effect of the present disclosure.

Furthermore, the lampshade body 1 is further provided with a lower light-transmitting portion 103 located on a lower side of the upper light-transmitting portion 102 and integrally formed with the upper light-transmitting portion 102. A plurality of light refracting curved surfaces 1031 are arranged on an outer circumferential side of the lower light-transmitting portion 103 and distributed in a circular array for refracting light patterns. By providing the light refracting curved surfaces 1031 on the outer circumferential side of the lower light-transmitting portion 103 in the present disclosure, the light patterns can be radiated and emitted by the light refracting curved surfaces 1031 on the ground when the lamp is turned on, which is used for further improving the viewing effect of the present disclosure, meanwhile, the places are greatly beautified.

Furthermore, both the lower light-transmitting portion 102 and the upper light-transmitting portion 102 are formed as convoluted, and a radial dimension of the lower light-transmitting portion 103 is smaller than that of the upper light-transmitting portion 102, which has the advantages of facilitating the entire lamp to project light patterns distributed circumferentially.

Furthermore, the transparent lampshade body 1 is further provided with a light diffusing cavity 104 located within the upper light-transmitting portion 102 and the lower light-transmitting portion 103, and the light diffusing cavity 104 is communicated with the installing recess 101 and used for diffusing the light emitted by the solar luminous lamp assembly 2. A purpose of using the light diffusion cavity 104 is to greatly improve the diffusing effect of the light emitted by the solar luminous lamp assembly 2.

Furthermore, the solar lamp further comprises the solar luminous lamp assembly 2 arranged in the installing recess 101 for emitting light. The solar luminous lamp assembly 2 comprises a solar power-generating panel 21, a PCB board 22, and a luminous lamp bead 23.

The solar power-generating panel 21 is arranged within the installing recess 101 and used for solar power generation, the PCB board 22 is arranged on a lower side of the solar power-generating panel 21 and connected with the solar power-generating panel 21, and the luminous lamp bead 23 is connected to the PCB board 22 for energizing to emit light. The solar luminous lamp assembly 2 has the advantages of simple structure, belonging to the existing technology, and easy use.

Furthermore, the lampshade body 1 is further provided with a connecting through hole 105 located at a bottom thereof.

The solar lamp further comprises a power storing-supplying assembly 3 arranged in the connecting through hole 105 and connected with the PCB board 22 for storing electric energy generated by the solar power-generating panel 21 and also supplying power to the luminous lamp bead 23.

The power storing-supplying assembly 3 is arranged in the connecting through hole 105 in the present disclosure, which has the advantages of greatly reducing not only the overall thickness but also the production cost of the solar luminous lamp assembly 2.

Furthermore, the solar lamp further comprises a reflective cup 4 connected to the installing recess 101 and located on a lower side of the solar power-generating panel 21, and an avoiding through hole 41 is formed at the middle portion of the reflective cup 4 for the luminous lamp bead 23 passing through, and a lower side of the reflective cup 4 is provided with a conical reflecting surface 42 extending downwards inside the light diffusing cavity 104 and configured as an inverted conical shape for reflecting the light of the luminous lamp bead 23. The conical reflecting surface 42 is provided with upper-lower through hole 421 penetrating up and down, and one side of the upper-lower through hole 421 is provided with a bent limiting portion 422 protruding upwardly.

The power storing-supplying assembly 3 comprises a first limiting connection member 31, a first connecting housing 32, a first storage battery 33, a first upper connection conductive member 34, a first lower connection conductive member 35 and a first connecting wire 36. The first limiting connection member 31 is sleeved into the connecting through hole 105, wherein an upper portion thereof is extended to an upper side of the connecting through hole 105. A first connecting cavity 311 for connection is formed in the first limiting connection member 31, and a first upper end opening 312 communicating with the first connecting cavity 311 is formed at an upper end thereof. An upper end of the first connecting housing 32 is connected in the first connecting cavity 311 and a battery storage chamber 321 is provided in the first connecting housing 32, and the first storage battery 33 is arranged within the battery storage chamber 321. The first upper connection conductive member 34 is arranged within the first connecting cavity 311 and located on an upper side of the upper end portion of the first connecting housing 32 for connecting to an upper end of the first storage battery 33. The first lower connection conductive member 35 is arranged within the battery storage cavity 321 and connected to a lower side of the first storage battery 33, and one end thereof is extended upwardly to hang and hook on an upper end of the first connecting housing 32 for connecting with the first upper connection conductive member 34. The first lower connection conductive member 35 is preferably a battery spring. When the first connecting housing 32 is threadedly connected to the first limiting connection member 31, the first lower connection conductive member 35 is squeezed by the first storage battery 33 to contract downwardly for fastening and stabilizing the first lower connection conductive member 35, and then, when the first connecting housing 32 is moved upwardly, the upper end of the first lower connection conductive member 35 and the upper end of the first storage battery 33 are forced to be in contacted with the first upper connection conductive member 34 respectively, thus to achieve a positive and negative connection.

An lower end of the first connecting wire 36 is connected to the first upper connection conductive member 34, while the upper end is successively passed through the first upper end opening 312, the light diffusing cavity 104 and the upper-lower through hole 421, and then is wound on the bent limiting portion 422 and connected with the PCB board 22. The advantage herein is that: the first connecting wire 36 is wound and tightened through the bent limiting portion 422, which not only benefits the first connecting wire 36 to be in a tight state in the light diffusing cavity 104 for improving the hiding effect, but also facilitates the welding process with the PCB board 22 subsequently.

Furthermore, the first connecting wire 36 is a silver wire, or a silver-plated wire, preferably a silver wire, which has the advantage of achieving the effect of hiding the connecting wires under a brightening condition, thereby helping to maximally improve the brightening effect of the entire solar lamp in the present disclosure.

Furthermore, the number of the first connecting wires 36 is two, and a purpose herein is to meet a connection of positive and negative electrodes.

Furthermore, the solar lamp further comprises a connecting sleeve 7 arranged on an outside of the power storing-supplying assembly 3 and used for protecting the power storing-supplying assembly 3, and a ground-inserting connector 8 connected to a lower side of the connecting sleeve 7 and used for inserting into a lawn. The advantage thereof is to meet the need of inserting into the lawn, and to meet the need of adjusting a height of the entire lamp by changing the connecting sleeves 7 of different heights.

Embodiment 2

Figure 12:
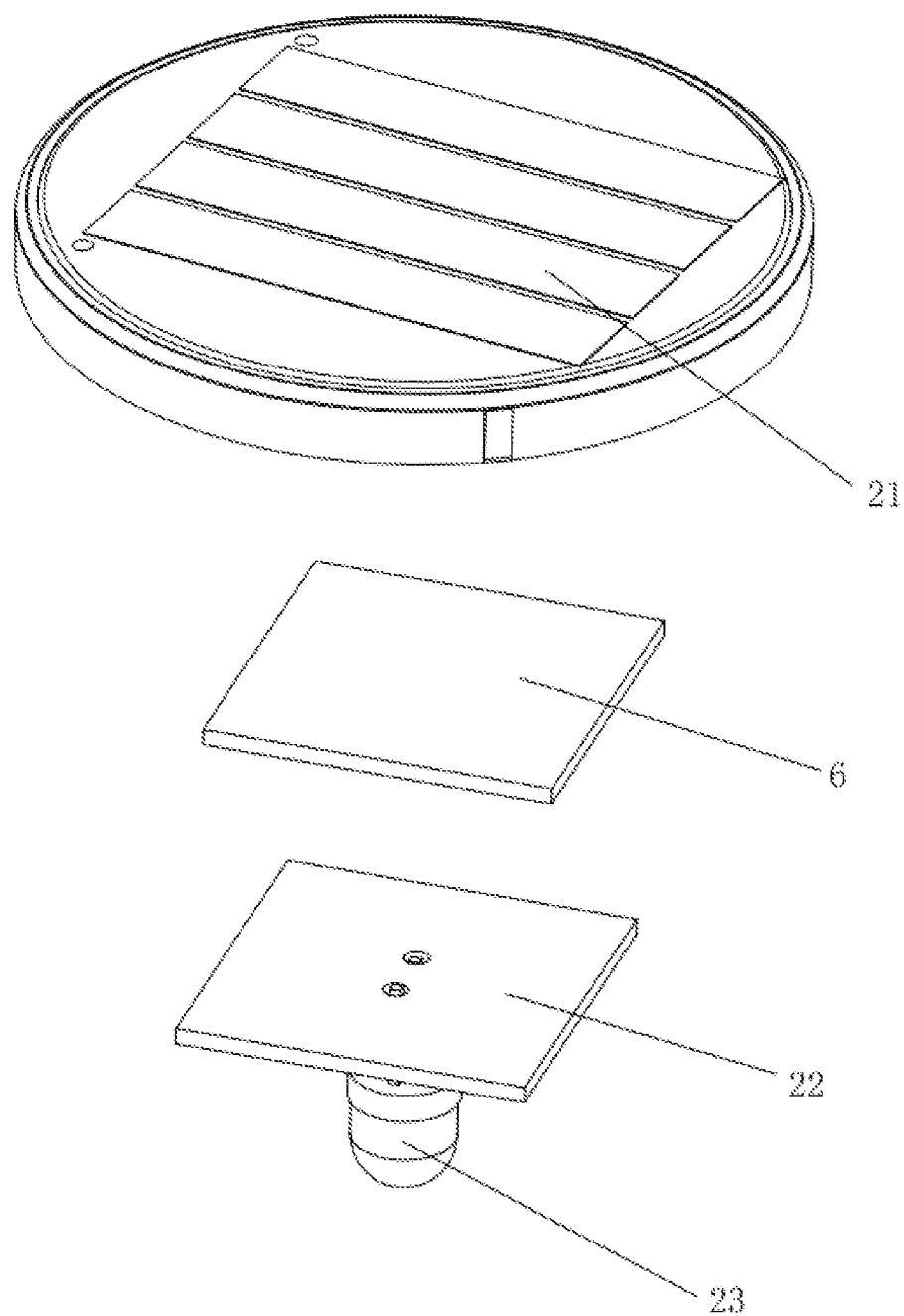
FIG. 12 is a partial exploded view of a sheet power storing-supplying module and the solar luminous lamp assembly of the solar lamp according to Embodiment 2 of the present disclosure.
Figure 13:
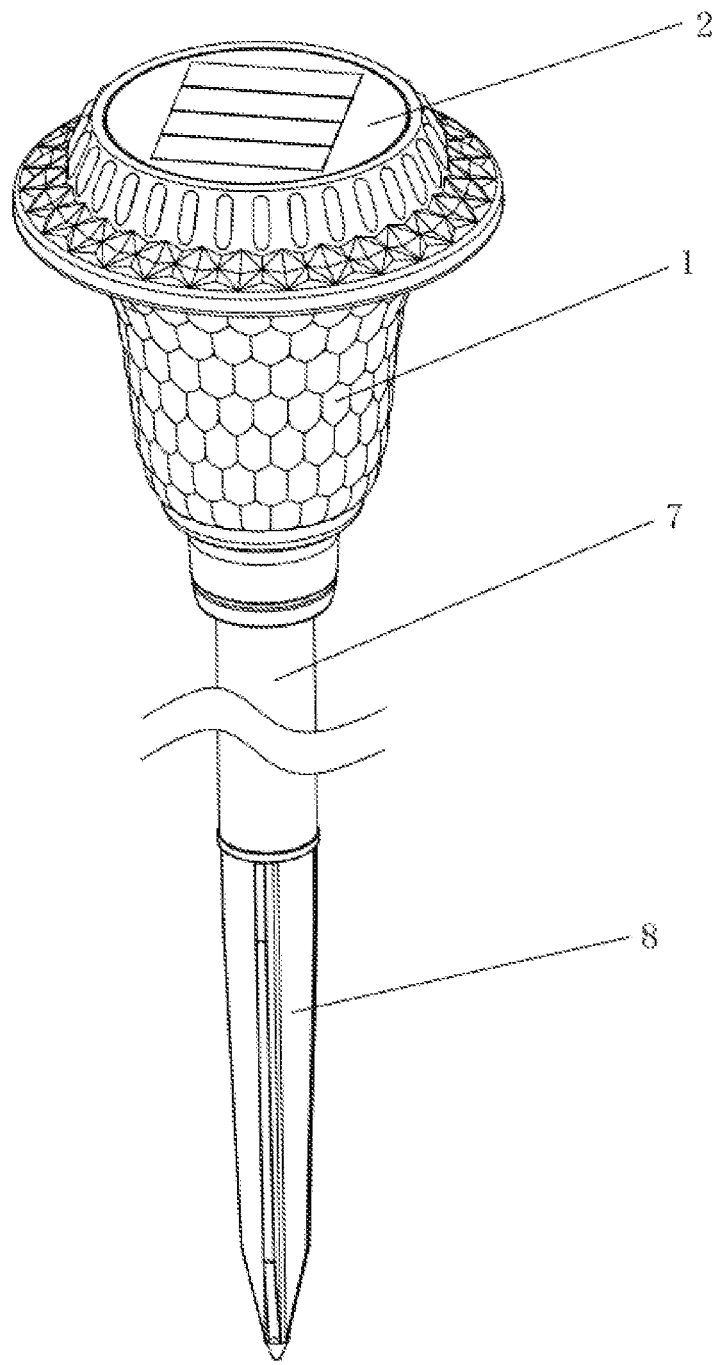
FIG. 13 is a perspective view of the solar lamp according to Embodiment 3 of the present disclosure.
Figure 14:
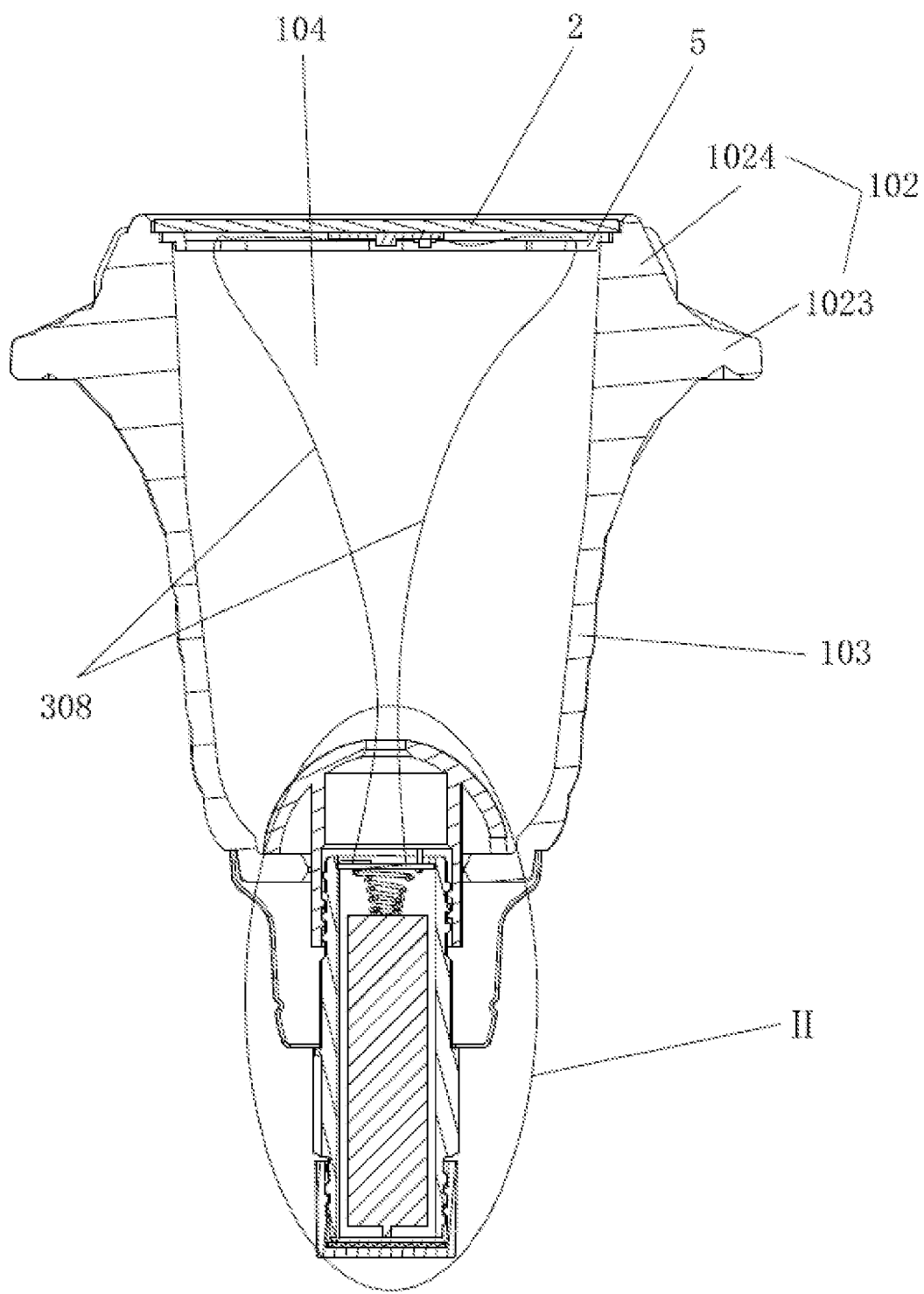
FIG. 14 is a cross-sectional view of the solar lamp according to Embodiment 3 of the present disclosure when a connecting sleeve and the ground-inserting connector are hidden.
Figure 15:
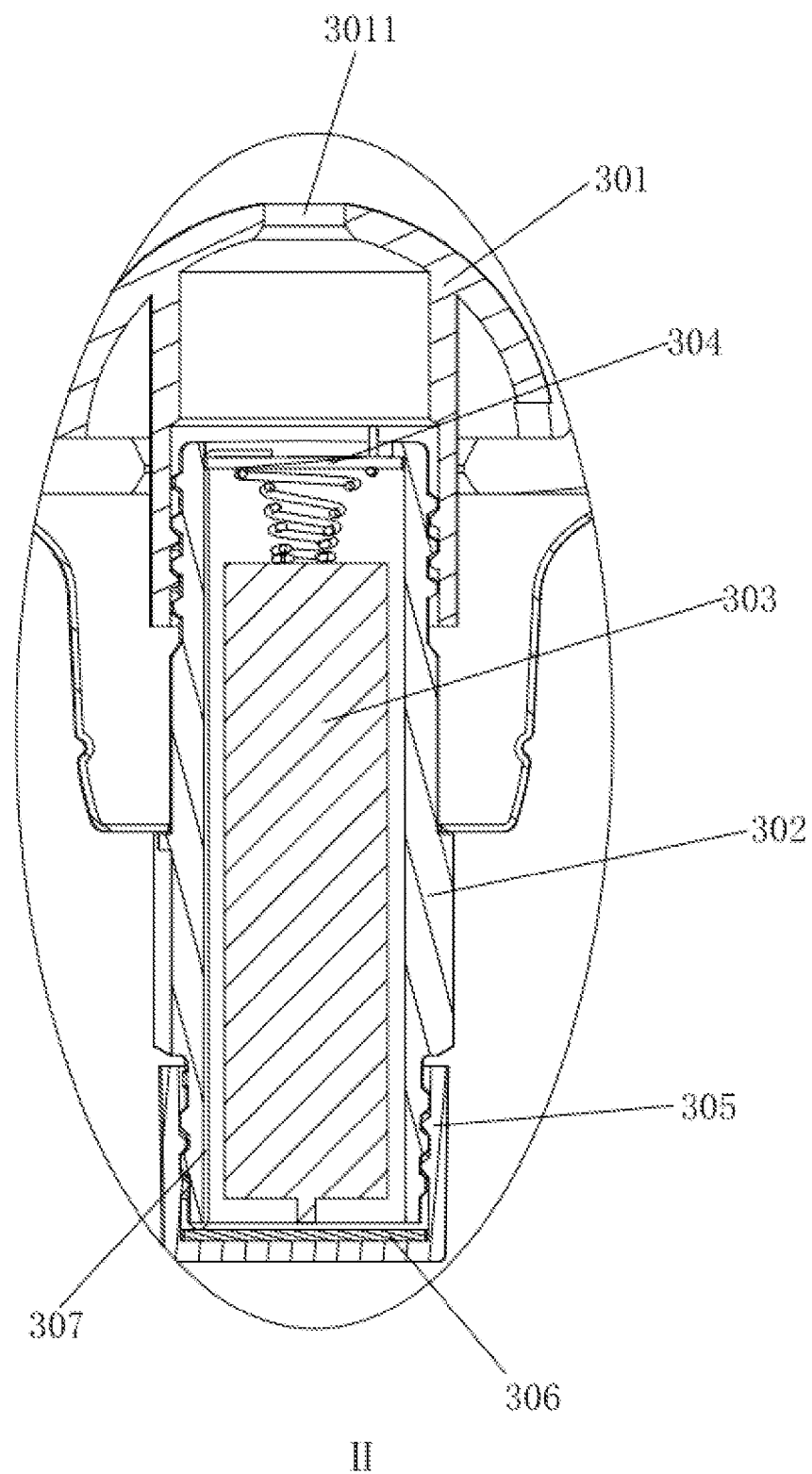
FIG. 15 is a partial enlarged view II of FIG. 14.
Figure 16:
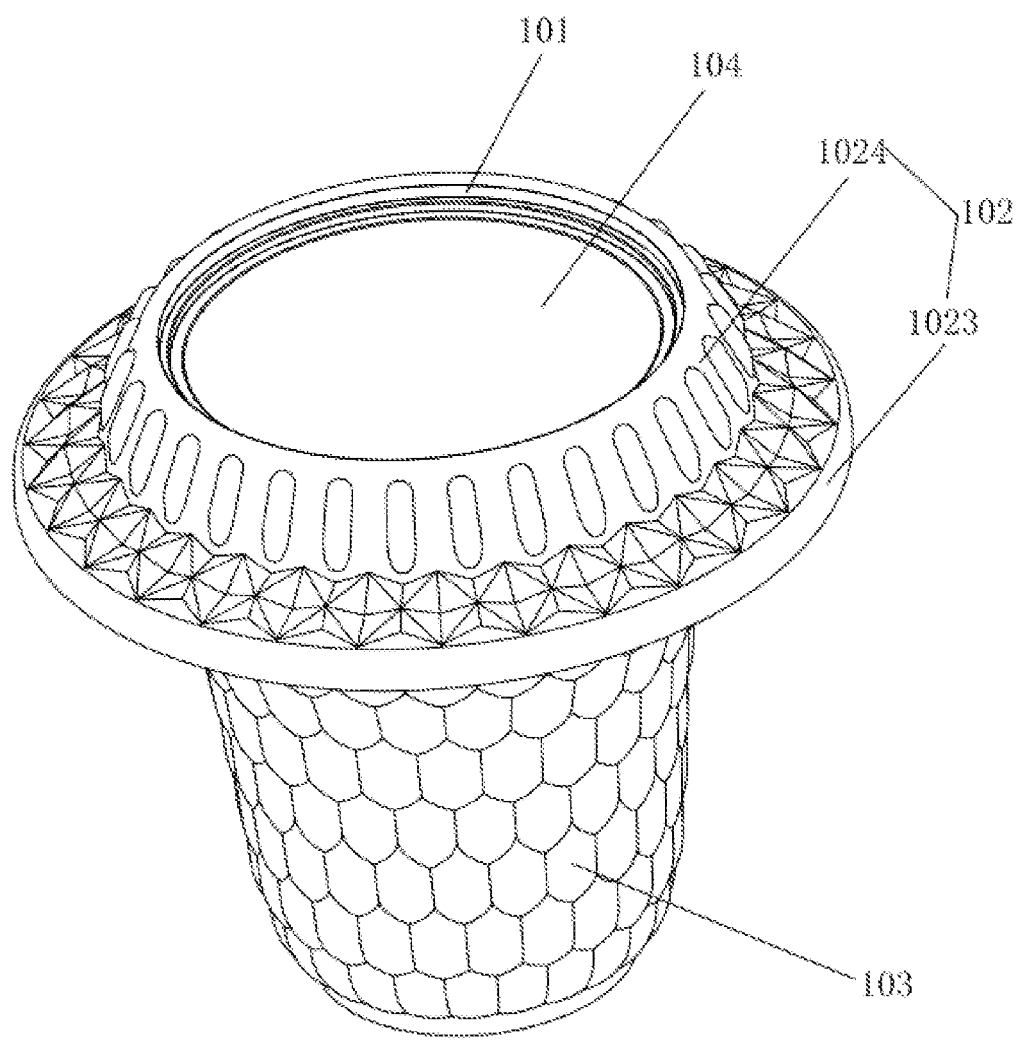
FIG. 16 is a perspective view of the transparent lampshade of the solar lamp according to Embodiment 3 of the present disclosure.
Figure 17:
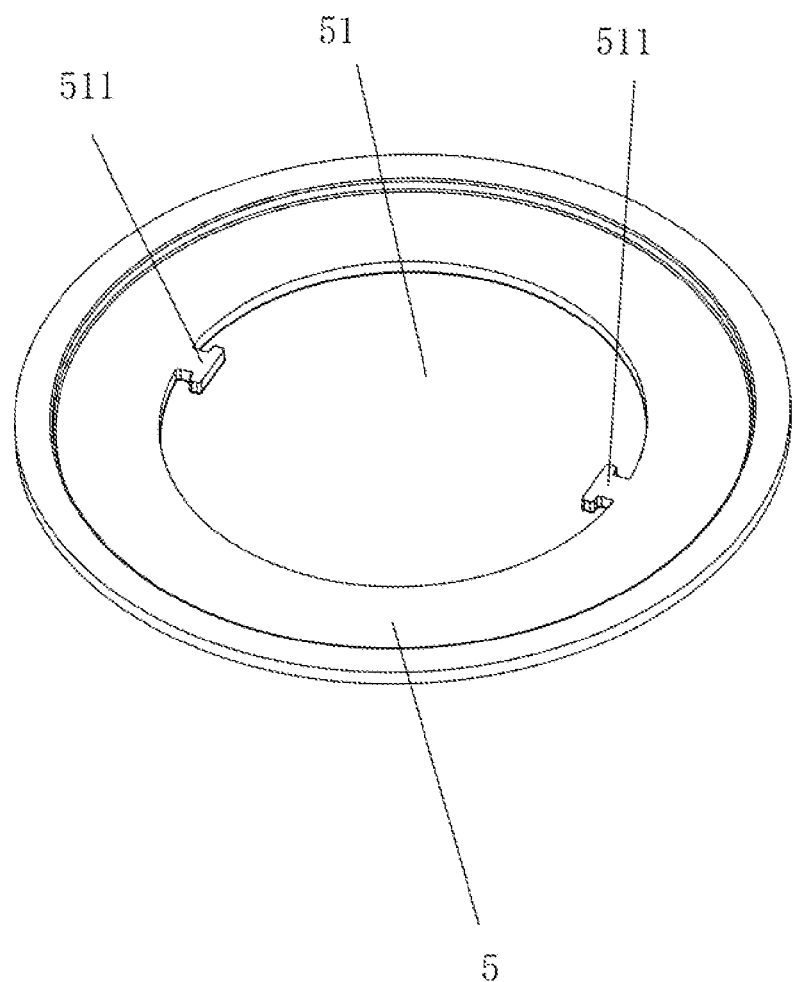
FIG. 17 is a perspective view of a connection limiting board of the solar lamp according to Embodiment 3 of the present disclosure.

As shown in FIG. 12, the difference between Embodiment 2 and Embodiment 1 is as follow.

The solar lamp further comprises a sheet power storing-supplying module 6 arranged on a lower side of the solar power-generating panel 21 and connected with the PCB board 22 and used for storing electric energy generated by the solar power-generating panel 21 and also supplying power to the luminous lamp bead 23. The sheet power storing-supplying module 6 is preferably an existing ultra-thin battery, which has the advantage of greatly decreasing an overall height of the solar luminous lamp assembly 2 and greatly simplifying the production steps, thus to help reduce the workload of workers.

Embodiment 3

As shown in FIG. 13 to FIG. 17, the difference between Embodiment 3 and Embodiment 1 is as follow.

The upper light-transmitting portion 102 comprises a second outer convex annular portion 1023 protruding outwardly, and an upper convex sloping annular portion 1024 arranged on an upper side of the second outer convex annular portion 1023 and arranged obliquely inward, and a purpose herein is to design another structure suitable for use.

Furthermore, the solar lamp further comprises a connection limiting board 5 connected to the installing recess 101 and located on an lower side of the solar power-generating panel 21, the connection limiting board 5 is provided with a penetrating hole 51 penetrating up and down, and the penetrating hole 51 are provided with inward extending portions 511 extending inwardly.

The power storing-supply assembly 3 comprises a second limiting connection member 301, a second connecting housing 302, a second storage battery 303, a second upper connection conductive member 304, a lower end connecting cover 305, a second lower connection conductive member 306, an intermediate connecting wire 307 and a second connecting wire 308.

The second limiting connection member 301 is sleeved into the connecting through hole 105, wherein an upper portion of the second limiting connection member 301 is protruded to an upper side of the connecting through hole 105. A second connecting cavity for connection is formed in the second limiting connection member 301, and a second upper end opening 3011 is formed at an upper end of the second limiting connection member 301 for communicating with the second connecting cavity. An upper end of the second connecting housing 302 is connected in the second connecting cavity, a battery accommodating chamber 3021 is formed in the second connecting housing 302, and the second storage battery 303 is arranged within the battery accommodating chamber 3021. The second upper connection conductive member 304 is arranged within the battery accommodating chamber 3021 at an upper side and connected to an upper end of the second storage battery 303. The second upper connection conductive member 304 is preferably composed of a conductive PCB board and a battery spring. The lower end connecting cover 305 is connected to a lower end at an outer side of the second connecting housing 302 for covering a lower end opening of the battery accommodating chamber 3021. The second lower connection conductive member 306 is arranged within the lower end connecting cover 305 and connected to a lower end of the second storage battery 303. The intermediate connecting wire 307 is arranged within the battery accommodating chamber 3021, a lower end of the intermediate connecting wire 307 is hooked on a lower end sidewall of the second connecting housing 302, and an upper end of the intermediate connecting wire 307 is connected to the second upper connection conductive member 304. When the second storage battery 303 is accommodated within the second connecting housing 302 and the lower end connecting cover 305 is threadedly connected to cover the lower end of the battery accommodating cavity 3021, the lower end connecting cover 305 drives the second lower connection conductive member 306 to contact and connect with the lower end of the intermediate connecting wire 307 and the lower end of the second battery 303, then the second storage battery 303 is squeezed to move upwards to upwardly squeeze the battery spring in the second upper connection conductive member 304 to contract upwards, so that the second upper connection conductive member 304 is forced to drive the intermediate connecting wire 307 to move upwardly to tighten and stabilize the intermediate connecting wire 307, thereby completing an initial connection work.

A lower end of the second connecting wire 308 is connected to the second upper connection conductive member 304, while an upper end thereof is successively passed through the second upper end opening 3011 and the light diffusing cavity 104 and then is extended to the penetrating hole 51 so as to be wound on the inward extending portions 511 and then is connected to the PCB board 22. The advantage herein is that: not only can the electric connection of the entire lamp of the present disclosure be completed, but also can the second connecting wire 308 be wound and tightened through the inward extending portions 511, which benefits the second connecting wire 308 to be in a tight state in the light diffusing cavity 104 for improving the hiding effect and facilitates the welding work with the PCB board 22 subsequently.

Furthermore, the second connecting wire 308 is a silver wire, or a silver-plated wire, preferably a silver wire, which has the advantage of achieving the effect of hiding the connecting wires under the brightening condition, thereby helping to maximally improve the brightening effect of the entire solar lamp in the present disclosure.

Furthermore, the number of the second connecting wires 308 is two, and a purpose herein is to meet a connection of positive and negative electrodes.

Embodiment 4

Figure 18:
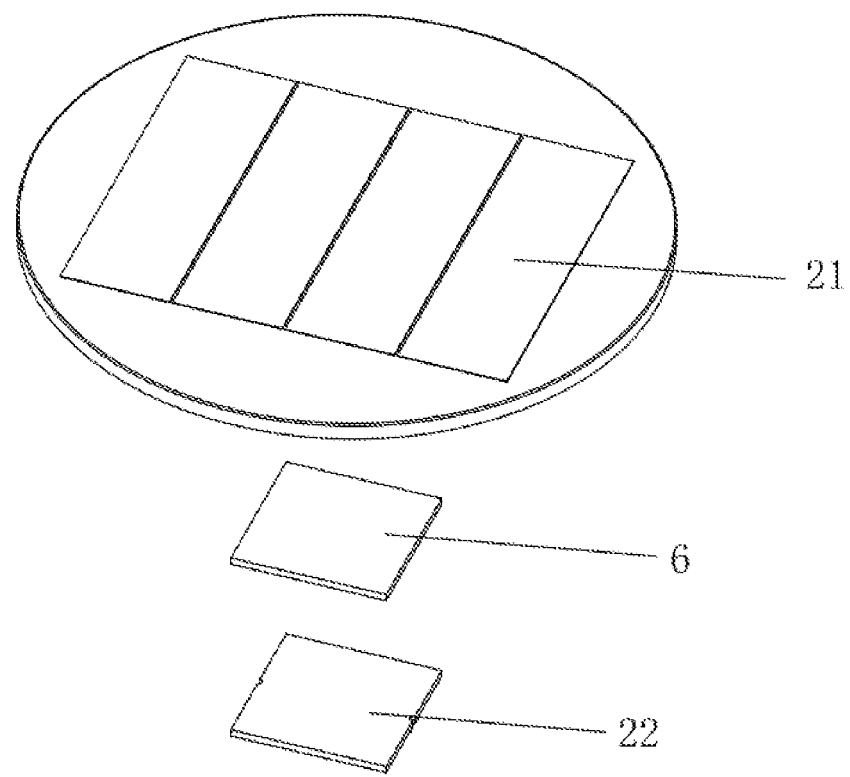
FIG. 18 is a partial exploded view of the sheet power storing-supplying module and solar luminous lamp assembly of the solar lamp according to Embodiment 4 of the present disclosure.

As shown in FIG. 18, the difference between Embodiment 4 and Embodiment 3 is as follow.

The solar lamp further comprises a sheet power storing-supplying module 6 arranged on a lower side of the solar power-generating panel 21 and connected with the PCB board 22 and used for storing electric energy generated by the solar power-generating panel 21 and supplying power source to the luminous lamp bead 23. The sheet power storing-supplying module 6 is preferably an existing ultra-thin battery, which has the advantage of greatly decreasing an overall height of the solar luminous lamp assembly 2 and greatly simplifying the production steps, thus to help reduce the workload of workers.

In summary, the embodiments of the present disclosure have been described in detail, but the present disclosure is not limited to the above embodiments. Even if various changes are made to the present disclosure, they still fall into the protective scope of the present disclosure.

What is claimed is:

1. A solar lamp, comprising a transparent lampshade used for solar lamp, and a solar luminous lamp assembly arranged in an downward installing recess for emitting light,
   wherein the transparent lampshade comprises a transparent lampshade body, an upper side of the lampshade body is provided with the downward installing recess for installing the solar luminous lamp assembly, and an upper light-transmitting portion located on a circumference of the downward installing recess and capable of exposing the solar luminous lamp assembly and capable of transmitting light upwardly;
   wherein the lampshade body is further provided with a light transmitting cavity below the downward installing recess, and the light transmitting cavity is communicated with the downward installing recess for transmitting the light emitted by the solar luminous lamp assembly;
   wherein the solar luminous lamp assembly comprises: a solar power-generating panel arranged within the downward installing recess and used for solar power generation; a PCB board arranged on a lower side of the solar power-generating panel and connected with the solar Dower-generating panel; and a luminous lamp bead electrically connected to the PCB board for emitting light;

wherein the lampshade body is further provided with a connecting through hole located at a bottom thereof; the solar lamp further comprises a power storing-supplying assembly arranged in the connecting through hole and connected with the PCB board and used for storing electric energy generated by the solar power-generating panel and also supplying power to the luminous lamp bead;

wherein the power storing-supplying assembly comprises a first limiting connection member, a first connecting housing, a first storage battery, a first upper connection conductive member, a first lower connection conductive member and a first connecting wire;

the first limiting connection member is sleeved into the connecting through hole, wherein an upper portion thereof is extended to an upper side of the connecting through hole, a first connecting cavity for connection is formed in the first limiting connection member, and a first upper end opening communicating with the first connecting cavity is formed at an upper end thereof;

an upper end of the first connecting housing is connected in the first connecting cavity and a battery storage chamber is provided in the first connecting housing, the first storage battery is arranged within the battery storage chamber;

the first upper connection conductive member is arranged within the first connecting cavity and located on an upper side of the upper end portion of the first connecting housing for connecting to an upper end of the first storage battery;

the first lower connection conductive member is arranged within the battery storage cavity and connected to a lower side of the first storage battery, and one end thereof is extended upwardly to hang and hook on an upper end of the first connecting housing for connecting with the first upper connection conductive member;

an lower end of the first connecting wire is connected to the first upper connection conductive member, while the upper end is successively passed through the first upper end opening, the light transmitting cavity and the upper-lower through hole, and then is connected with the PCB board.

2. The solar lamp according to claim 1, wherein the lampshade body is further provided with a lower light-transmitting portion located on a lower side of the upper light-transmitting portion and integrally formed with the upper light-transmitting portion.

3. The solar lamp according to claim 2, wherein both the lower light-transmitting portion and the upper light-transmitting portion are configured as convoluted, and a radial dimension of the lower light-transmitting portion is smaller than that of the upper light-transmitting portion.

4. The solar lamp according to claim 3, wherein the light transmitting cavity is located within the upper light-transmitting portion and the lower light-transmitting portion.

5. The solar lamp according to claim 1, wherein the upper light-transmitting portion comprises a first outer convex annular portion protruding outwardly, and an upper convex annular portion arranged on an upper side of the first outer convex annular portion and protruding upwardly.

6. The solar lamp according to claim 5, wherein light refracting patterns are provided on an outer surface of the first outer convex annular portion.

7. The solar lamp according to claim 1, wherein the upper light-transmitting portion comprises a second outer convex annular portion protruding outwardly, and an upper convex sloping annular portion arranged on an upper side of the second outer convex annular portion and arranged obliquely inward.

8. The solar lamp according to claim 1, wherein the solar lamp further comprises a sheet power storing-supplying module arranged on a lower side of the solar power-generating panel and connected with the PCB board and used for storing electric energy generated by the solar power-generating panel and also supplying power to the luminous lamp bead.

\* \* \* \* \*